US008700494B2

(12) United States Patent  
Carlson et al.

(10) Patent No.: US 8,700,494 B2
(45) Date of Patent: Apr. 15, 2014

(54) IDENTIFYING PRODUCT VARIANTS

(75) Inventors: Andy Carlson, Pittsbugh, PA (US);
Liangying Wu, Pittsburgh, PA (US);
Timothy Stevenson, Zurich (CH)

(73) Assignee: Google Inc., Mountain View, CA (US)

( * ) Notice: Subject to any disclaimer, the term of this patent is extended or adjusted under 35 U.S.C. 154(b) by 147 days.

(21) Appl. No.: 13/226,333

(22) Filed: Sep. 6, 2011

(65) Prior Publication Data

US 2013/0060662 A1 Mar. 7, 2013

(51) Int. Cl.
*G06Q 30/00* (2012.01)
(52) U.S. Cl.
USPC .... 705/27.1; 705/26.1; 705/26.41; 705/26.61
(58) Field of Classification Search
USPC ................ 705/26.61, 26.41, 26.1, 27.2, 27.1
See application file for complete search history.

(56) References Cited

U.S. PATENT DOCUMENTS

| | | | | |
|---|---|---|---|---|
| 6,128,600 | A * | 10/2000 | Imamura et al. | 705/26.41 |
| 6,223,094 | B1 | 4/2001 | Muehleck et al. | |
| 6,631,356 | B1 * | 10/2003 | Van Horn et al. | 705/26.2 |
| 6,847,972 | B1 | 1/2005 | Vernau et al. | |
| 7,107,230 | B1 * | 9/2006 | Halbert et al. | 705/26.2 |
| 7,895,080 | B2 * | 2/2011 | Haynes et al. | 705/26.41 |
| 2002/0154114 | A1 | 10/2002 | Christensen et al. | |
| 2002/0156684 | A1 | 10/2002 | Stone et al. | |
| 2004/0117271 | A1 | 6/2004 | Knight et al. | |
| 2004/0143600 | A1 | 7/2004 | Musgrove et al. | |
| 2005/0071251 | A1 | 3/2005 | Linden et al. | |
| 2005/0268255 | A1 | 12/2005 | Hrastnik et al. | |
| 2005/0289158 | A1 | 12/2005 | Weiss et al. | |
| 2006/0059135 | A1 | 3/2006 | Palmon et al. | |
| 2006/0218052 | A1 | 9/2006 | Haynes et al. | |
| 2006/0289637 | A1 | 12/2006 | Brice et al. | |
| 2007/0250705 | A1 | 10/2007 | Smith et al. | |
| 2009/0157472 | A1 | 6/2009 | Burazin et al. | |
| 2009/0187583 | A1 | 7/2009 | Pape et al. | |
| 2009/0198596 | A1 | 8/2009 | Dolan et al. | |

FOREIGN PATENT DOCUMENTS

| | | |
|---|---|---|
| JP | 2009-026195 A | 2/2009 |
| KR | 10-2009-0002145 A | 1/2009 |
| KR | 10-2009-0076575 A | 7/2009 |

OTHER PUBLICATIONS

Internet Article: eBay: Turbo Lister FAQ—Seller Tools retrieved from http://pages.ebay.com/turbolister, http://pages.ebay.com/turbolister2/faq.html, pp. 1-4, Nov. 30, 2010.

(Continued)

*Primary Examiner* — Yogesh C Garg
(74) *Attorney, Agent, or Firm* — Johnson, Marcou & Isaacs, LLC

(57) ABSTRACT

A product catalog system includes a product catalog having product offers received from various merchants. The product catalog system includes an analysis module that determines, for each merchant that provides product offers, which product offers are for products that are likely to be variants of one another based in part on titles of the products and assigns sets of product offers that are likely to be variants a merchant cluster identifier. The analysis module groups the product offers into product catalog entries based on the particular product that the offers are for. The analysis module determines which products are variants based on associations between the product catalog entries and the merchant cluster identifiers of the product offers included in the product catalog entries.

18 Claims, 6 Drawing Sheets

(56) References Cited

OTHER PUBLICATIONS

Internet Article: eBay: Turbo Lister—Seller Tools—List Multiple Items and Upload to eBay in Bulk!, http://pages.ebay.com/turbo_lister, pp. 1-2, Nov. 30, 2010.

eBay—Turbo Lister Listing Activity Quick Start Guide, *eBay File Exchange Catalog Listing Template Instructions*, vol./Iss: Ver. 1.1, pp. 1-8, Apr. 1, 2007.

Liu et al., Clustering Billions of Images with Large Scale Nearest Neighbor Search, *IEEE Workshop on Applications of Computer Vision (WACV'07)*, pp. 1-6, Jan. 1, 2007.

Iwarere, O., Office Action cited in copending U.S. Appl. No. 12/950,655, filed Nov. 19, 2010, pp. 1-16, Aug. 5, 2013.

Oh, E. G, International Search Report and Written Opinion filed in International Application No. PCT/US2012/054027, pp. 1-11, Feb. 27, 2013.

Civan, E., Office Action issued in copending U.S. Appl. No. 13/165,761 filed Jun. 21, 2011, pp. 1-14, Oct. 8, 2013.

* cited by examiner

IDENTIFYING PRODUCT VARIANTS

TECHNICAL FIELD

The present disclosure relates generally to electronic product catalogs, and more specifically, to identifying product variants and presenting information regarding the product variants.

BACKGROUND

Computer networks, such as the Internet, enable transmission and reception of a vast array of information. In recent years, for example, some commercial retail stores have attempted to make product information available to customers over the Internet. It is becoming increasingly popular for information providers to provide mechanisms by which customers can compare such product information across multiple manufacturers and retailers. For simplicity, manufacturers, retailers, and others that sell products to customers are interchangeably referred to herein as "merchants." For example, Internet search/shopping sites allow customers to compare pricing information for products across multiple merchants.

When many merchants sell the same product, it is important to identify the unique product being sold by different merchants and group product information and product offers that are for the same product together. This facilitates the creation of user interfaces that organize results to reduce the cognitive load on the user. Users can view results for a certain product, sold by various merchants for specific prices, leading to more of a "price comparison" experience. If this is not provided, the user may be presented with a jumbled collection of results that mix different products for sale together, and the user must perform a lot of work just to understand which results present offers for the same product from different merchants.

Just as knowing which product offers from different merchants are for the same product, better user interfaces can be created when a system knows that different products for sale are variants of one another, for example products having different colors or different sizes. Without this knowledge, the user must digest a collection of results and reason about the results to determine that two results are different colors or sizes of the same product. Therefore, it is desirable to present results that are organized to present product variants in a user friendly way.

SUMMARY

In certain exemplary embodiments, a method for identifying product variants includes a computer receiving product offers from merchants. At least a portion of the product offers includes a product title having a variant attribute value that identifies a variant of a product subject to the product offer. The computer identifies at least one set of product offers for each merchant that is likely to be variants based on the product title of the product offers and assigns a merchant cluster identifier to each set of product offers. The computer assigns the identified product offers to product catalog entries based on the product subject to each product offer, whereby each product category entry is for a particular product. The computer identifies, for each product catalog entry, each merchant cluster identifier assigned to a product offer assigned to the product catalog entry and associates each identified merchant cluster identifier with the product catalog entry. The computer determines at least one set of product catalog entries that include variants of a product based on associations of the product catalog entries with merchant cluster identifiers.

These and other aspects, objects, features, and advantages of the exemplary embodiments will become apparent to those having ordinary skill in the art upon consideration of the following detailed description of illustrated exemplary embodiments, which include the best mode of carrying out the invention as presently perceived.

DETAILED DESCRIPTION OF EXEMPLARY EMBODIMENTS

Overview

Figure 1:
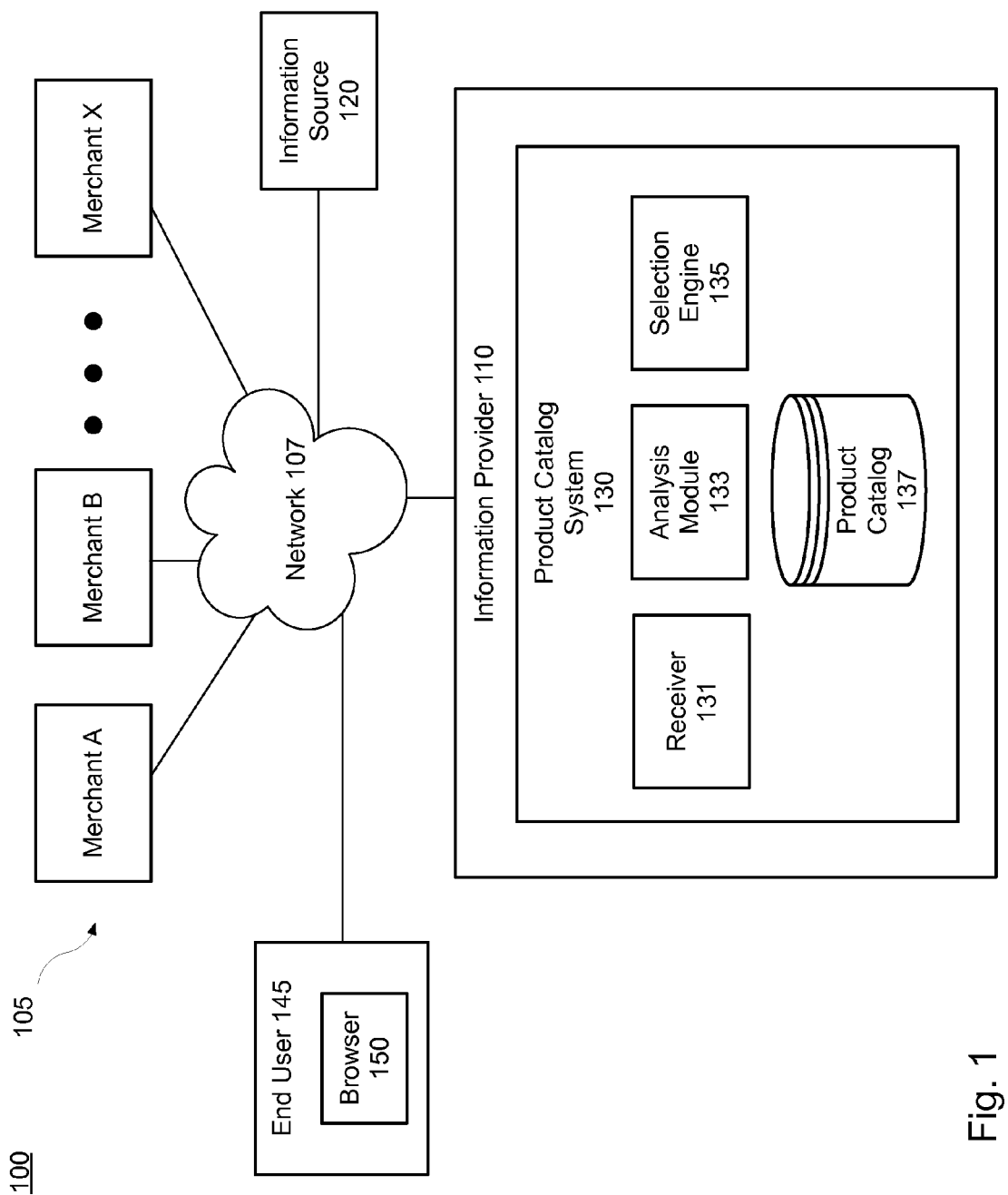
FIG. 1 depicts a system for identifying product variants and presenting information regarding the product variants, in accordance with certain exemplary embodiments.

The methods and systems described herein enable identification of product variants. The system includes a product catalog system that is implemented in hardware and/or software. The product catalog system receives information regarding products and/or product offers from multiple merchants and transmits product information to users in response to queries. Typically, the product information received and stored by the product catalog system includes a title for the product, a description of the product, a product category, one or more images, one or more videos, product rating or review information, pricing information, and/or one or more product identifiers, such as a Global Trade Item Number ("GTIN"), International Standard Book Number ("ISBN"), Universal Product Code ("UPC"), Manufacturer Part Number ("MPN"), European Article Number ("EAN"), Japanese Article Number ("JAN"), brand name and model number combination, and/or other identifier.

An analysis module of the product catalog system can review the product information to identify product variants. In one embodiment, the analysis module creates, for each individual merchant, groups of product offers that appear to be variants of one another. Merchants tend to include variant attribute values in product titles (or other product content) and also tend to generate titles for variants using templates where the attribute values are substituted into a template. For example, a template for a product title may resemble: [(Product Name)-(Attribute Value)]. If the product is a music player and the variable attribute is a color, the template may be populated as "Music Player-Black." The analysis module can use this knowledge regarding product titles to group product variants for each merchant.

The analysis module also can use the groups of product offers for the merchants to create a set of product catalog entries that are annotated with variant information. That is, the analysis module groups product offers for the various merchants into product catalog entries such that each product catalog entry contains product offers for a particular product variant. The product catalog entries may be database entries, table entries, or other form of an electronic record for grouping product offers. One obstacle to creating the set of product catalog entries is that it is desirable to present users with the values of the attributes that make each product in the group of product variants unique, and different merchants often format values in different ways. For example, one merchant might use "Red," "Blue," and "Green" in the product title and another merchant may use "Red," "Blu," and "Lgt Grn" in the product title to indicate the color of the product. The analysis module can review the variant values for each product offer and group the product offers into variant groups based on the variant values. In one embodiment, the analysis module builds a graph linking merchant product variant groups with product catalog entries, where the links are based on the product identifiers of the products. From this graph, the analysis module can select the set of product variants for the each products and the attribute values for each product to use when presenting the product variant information.

One or more aspects of the exemplary embodiments may include a computer program that embodies the functions described and illustrated herein, wherein the computer program is implemented in a computer system that comprises instructions stored in a machine-readable medium and a processor that executes the instructions. However, it should be apparent that there could be many different ways of implementing the exemplary embodiments in computer programming, and the exemplary embodiments should not be construed as limited to any one set of computer program instructions. Further, a skilled programmer would be able to write such a computer program to implement an embodiment based on the appended flow charts and associated description in the application text. Therefore, disclosure of a particular set of program code instructions is not considered necessary for an adequate understanding of how to make and use the exemplary embodiments. Moreover, any reference to an act being performed by a computer should not be construed as being performed by a single computer as the act may be performed by more than one computer. The functionality of the exemplary embodiments will be explained in more detail in the following description, read in conjunction with the figures illustrating the program flow.

Turning now to the drawings, in which like numerals indicate like (but not necessarily identical) elements throughout the figures, exemplary embodiments are described in detail.

System Architecture

FIG. 1 depicts a system 100 for identifying product variants and presenting information regarding the product variants, in accordance with certain exemplary embodiments. As depicted in FIG. 1, the system 100 includes network devices 105, 110, 120, and 145, that are configured to communicate with one another via one or more networks 107. Each network 107 includes a wired or wireless telecommunication means by which network devices (including network devices 105, 110, 120, 145) can exchange data. For example, each network 107 can include a local area network ("LAN"), a wide area network ("WAN"), an intranet, an Internet, a mobile telephone network, or any combination thereof. Throughout the discussion of exemplary embodiments, it should be understood that the terms "data" and "information" are used interchangeably herein to refer to text, images, audio, video, or any other form of information that can exist in a computer-based environment.

Each network device 105, 110, 120, 145 includes a device capable of transmitting and receiving data over the network 107. For example, each network device 105, 110, 120, 145 can include a server, desktop computer, laptop computer, smartphone, handheld computer, tablet computer, personal digital assistant ("PDA"), or any other wired or wireless, processor-driven device. In the exemplary embodiment depicted in FIG. 1, the network devices 105, 110, 120, 145 are operated by merchants, an information provider, an information source, and end users, respectively.

The end user network devices 145 each include a browser application module 150, such as Microsoft Internet Explorer, Firefox, Netscape, Google Chrome, or another suitable application for interacting with web page files maintained by the information provider network device 110 and/or other network devices. The web page files can include text, graphic, images, sound, video, and other multimedia or data files that can be transmitted via the network 107. For example, the web page files can include one or more files in the Hypertext Markup Language ("HTML"). The browser application module 150 can receive web page files from the information provider network device 110 and can present the web pages to an end user operating the end user network device 145. In certain exemplary embodiments, the web pages include information from a product catalog 137 of a product catalog system 130, which is maintained by the information provider network device 110. The product catalog system 130 and other components of FIG. 1 are described in more detail hereinafter with reference to the method illustrated in FIG. 2.

System Process

Figure 2:
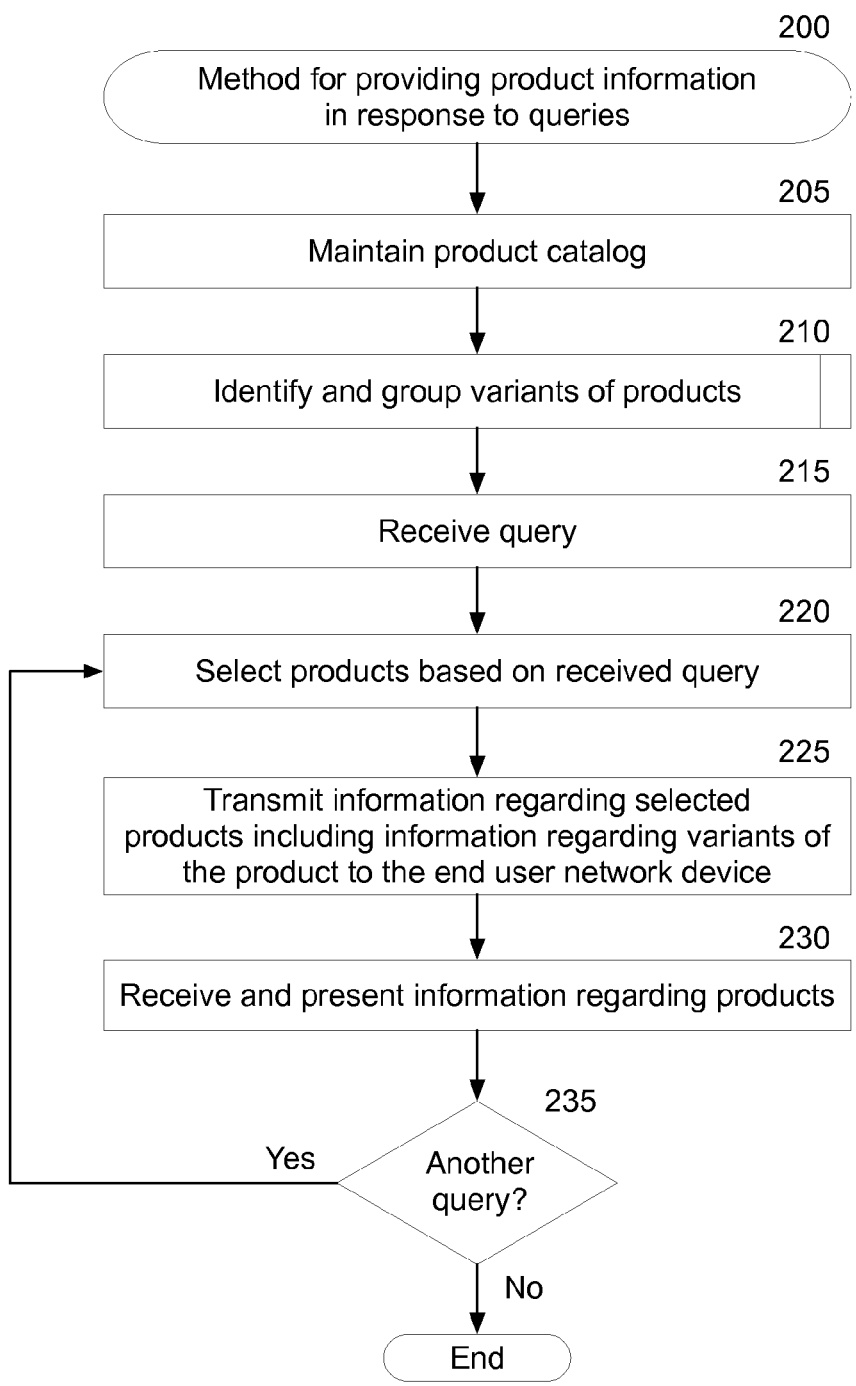
FIG. 2 is a block flow diagram depicting a method for providing product information in response to queries, in accordance with certain exemplary embodiments.

FIG. 2 is a block flow diagram depicting a method 200 for providing product information in response to queries, in accordance with certain exemplary embodiments. The method 200 is described with reference to the components illustrated in FIG. 1.

In block 205, the product catalog system 130 maintains the product catalog 137. The product catalog 137 includes a data structure, such as one or more databases and/or electronic records, that includes information regarding products and/or product offers from at least one merchant 105. For each product, the information in the product catalog 137 typically includes at least one product identifier, such as a GTIN, UPC, MPN, ISBN, EAN, JAN, and/or brand name and model number combination. The information also can include, for each product, a title for the product, a description of the product, a product category, one or more images, one or more videos, product rating or review information, pricing information, and/or any other suitable information associated with a product. As used throughout the specification, the term "product" should be interpreted to include tangible and intangible products, as well as services.

In certain exemplary embodiments, a receiver module 131 of the product catalog system 130 receives information that is included in the product catalog 137 in electronic data feeds and/or hard copy provided by one or more merchants 105 and/or another information source 120, such as a specialized information aggregator. For example, the merchant 105 and/or information source 120 may periodically provide batched or unbatched product data in an electronic feed to the receiver module 131. The receiver module 131 also may receive product information from scanned product documentation and/or catalogs. In certain exemplary embodiments, the receiver module 131 also may receive the product data from a screen scraping mechanism or a web crawling mechanism, which is included in or associated with the product catalog system 130. For example, the screen scraping mechanism may capture product information from the merchant and/or information source websites. In certain exemplary embodiments, end users may view information from the product catalog 137 via browsers 150 on their respective end user network devices 145.

In block 210, an analysis module 133 of the product catalog system 130 analyzes the product information to identify product variants and group variants of each product together. In one embodiment, the analysis module 133 analyzes the product offers for each merchant 105 individually to identify product variants offered by each respective merchant 105. The analysis module 133 groups the product offers for each merchant 105 into merchant variant product groups, where each merchant variant product group contains product offers for variants of a product offered by the respective merchant 105. That is, the analysis module 133 creates a merchant variant product group for each product of a merchant 105 that has variants and populates each merchant variant product group with the product offers that are variants of that respective product. In one embodiment, the analysis module 133 identifies the product variants for each merchant 105 using information contained in the product title of each product offer.

The analysis module 133 uses the merchant variant product groups to map the product offers to variant product catalog entries. Each product catalog entry includes or is linked to product offers for a particular variant of a product. Each product catalog entry can contain product offers for the product variant from one or more of the merchants 105. The analysis module 133 also identifies variant attribute values for the product variants for presentation by a user interface of the product catalog system 130. For instance, different merchants 105 often use different attribute values for designating variants. The analysis module 133 can decide on a set of attribute values and use that set with the user interface. Block 210 is described in more detail hereinafter with reference to the method 210 of FIG. 3.

In block 215, the product catalog system 130 receives a query. For example, a user operating the end user network device 145 may navigate to an Internet website of the product catalog system 130 using the browser application module 150. At the website, the user may enter a query for a product and the end user network device 145 transmits the query to the information provider network device 110.

In block 220, a selection engine 135 of the product catalog system 130 selects one or more product catalog entries for transmitting information regarding thereto to the end user network device 145 based on the received query. In one embodiment, the selection engine 135 attempts to identify the target product or category of product that the user is searching for and selects product catalog entries of products that satisfy the query.

In block 225, the information provider network device 110 transmits information regarding the products of the selected product catalog entries to the end user network device 145. This information includes information regarding variants of products that satisfy the query. Generally, the information transmitted to the end user network device 145 is sufficient to present the products and their variants to the end user operating the end user network device 145. The information may include the variant information in the form of a list of attribute values, as determined by the analysis module in block 210.

In block 230, the end user network device 145 receives the information regarding the selected products and the product variants, and the browser application module 150 presents the received information to the end user operating the end user network device 145. The browser application module 150 may present the variant product information via a drop down menu. For example, the list of attribute values for the product variants may be presented in the form of a drop down menu. Or, the list of attribute values may be displayed directly on a web page near the product information. Regardless of how the information regarding the product variants are presented, the user interface that presents the product variants can include a link to web pages that contain more information and/or product offers for the product variants. For example, each entry in a drop down menu may be linked to a web page for the product variant associated with that entry. If the entry is selected, then the browser application module 150 navigates to the web page for the selected entry. At that web page, product offers and/or other information for the product variant associated with the selected entry is presented to the user.

In block 235, the information provider network device 110 monitors for another query. If another query is received, the method 200 follows the "Yes" branch back to block 220 where one or more products are selected based on the received query. Otherwise, if another query is not received, the method 200 ends. Of course, the information provider network device 110 can continue to monitor for additional queries and provide product information in response to the received queries.

Figure 3:
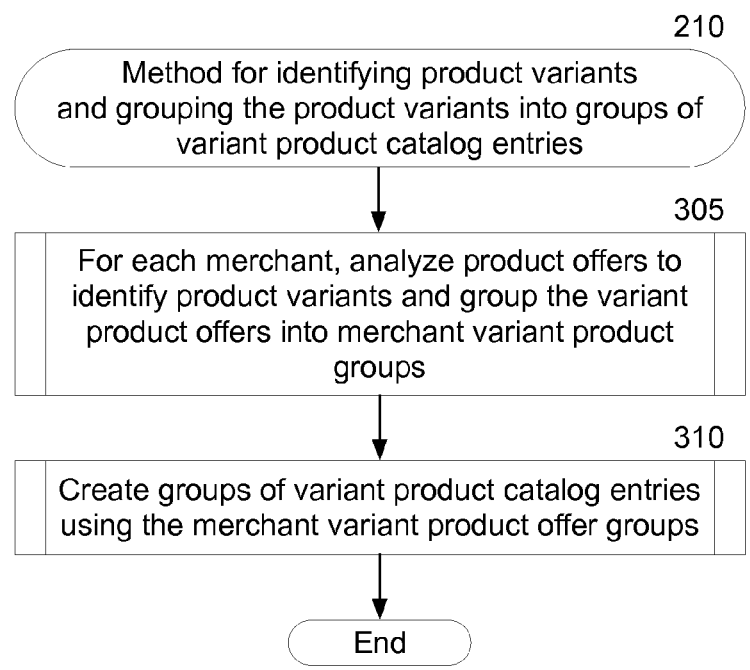
FIG. 3 is a block flow diagram depicting a method for identifying product variants and grouping the product variants into groups of variant product catalog entries, in accordance with certain exemplary embodiments.

FIG. 3 is a block flow diagram depicting a method 210 for identifying product variants and grouping the product variants into groups of variant product catalog entries, in accordance with certain exemplary embodiments, as referenced in block 210 of the method 200 of FIG. 2.

In block 305, the analysis module 133 analyzes the product offers for each merchant 105 to identify product offers of that merchant 105 that are directed to products that are variants of one another. Once identified, the product variants are linked, grouped, or otherwise associated together. In certain exemplary embodiments, the analysis module 133 identifies the product variants using information contained in the product titles of the product offers and links identified product variants by adding a merchant cluster identifier as an attribute to the product offers of each group of product variants. Block 305 is described in more detail hereinafter with reference to the method 305 of FIG. 4.

At this point, the product offers that are likely to be variants of one another are grouped together by merchant 105 in the merchant variant product clusters. In order to support a user interface that presents product information and/or product offers for variant products from different merchants 105, in block 310, the analysis module 133 groups the product variants into product catalog entries. To do this, in block 310, the analysis module 133 identifies the product for each product offer and groups or associates product offers for that product together. In one embodiment, the analysis module 133 identifies the products represented by product offers in the product catalog 137 and generates a product catalog entry for each identified product. The analysis module 133 links the product catalog entries with the appropriate merchant variant clusters and generates a graph using these links. The analysis module 133 analyzes the graph to select variants for each product and attribute values for use in identifying those product variants. Block 310 is described in more detail hereinafter with reference to the method 310 of FIG. 5.

Figure 4:
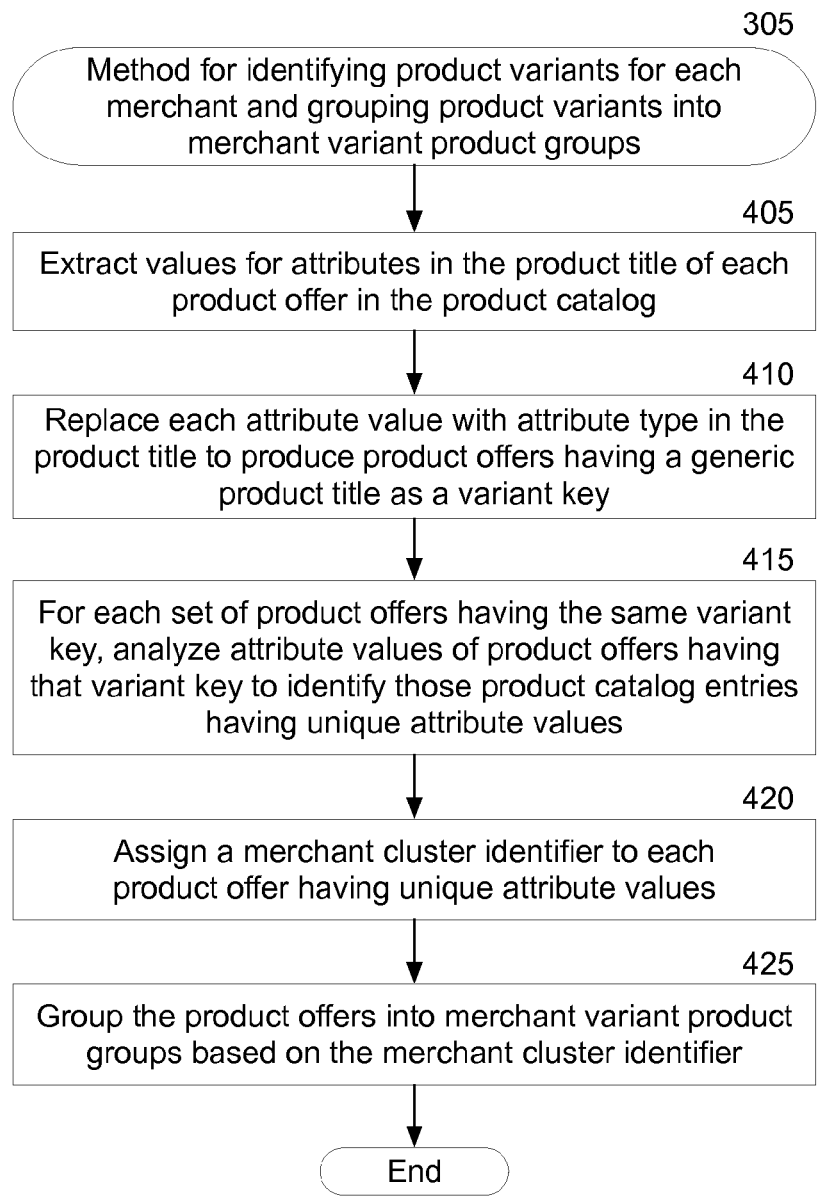
FIG. 4 is a block flow diagram depicting a method for identifying product variants for each merchant and grouping product offers into merchant variant product groups, in accordance with certain exemplary embodiments.

FIG. 4 is a block flow diagram depicting a method 305 for identifying product variants for each merchant and grouping product offers into merchant variant product groups, in accordance with certain exemplary embodiments, as referenced in block 305 of the method 210 of FIG. 2. In block 405, the analysis module 133 extracts attribute values from the product title of each product offer. In certain exemplary embodiments, the analysis module 133 executes an algorithm or computer program to identify certain attribute values that are typically related to a variant of a product. For example, the analysis module 133 may search each product title for names, abbreviations, patterns, or other designations of color, size, capacity, memory, or other attributes related to product variants. The analysis module 133 extracts any identified attribute values and stores or otherwise associates the attribute values with the respective product offer.

In certain exemplary embodiments, the analysis module 133 compares terms in the product title of each product offer to a dictionary of attribute values to identify the attribute values of the product title. In one example, a dictionary of sizes or size attributes may include patterns that match arbitrary sequences of digits. For instance, the pattern "D'×D'" matches any string in which the character "D" is replaced by a sequence of digits. Thus, the string "7'×9'" matches and the string "12'×24'" also matches. The dictionary can include a multitude of patterns that are typically used for sizes. The analysis module 133 can compare terms in a product title to the patterns to determine whether any of the terms match a pattern. If a term matches a pattern, then the analysis module 133 may determine that the term is a size attribute and extract the matching term. Similar pattern-based dictionary entries can be used for other attribute types that are commonly denoted using patterns.

In certain exemplary embodiments, the dictionary includes recursive definitions. For example, the dictionary may include dictionary entries such as "light ENTRY, where ENTRY can match any entry in the dictionary. This would enable a dictionary that includes the entries "light ENTRY," "metallic ENTRY," and "green ENTRY" to match the strings.

In block 410, for each product offer that had an attribute value extracted, the analysis module 133 replaces that attribute value with an attribute type in the product title. For example, if a product title of a product offer included the term "blue," then that term may be extracted from the product title in block 405 and replaced with the term "color" in block 410. This new product title for each product offer is a variant key used to group each merchant's product offers as discussed below with reference to block 415. For example, consider a product title of "Red Music Player." The analysis module 133 may replace the term "Red" with the term "Color" to form a new product title of "Color Music Player." This new product title also serves as the variant key for that product offer. Although in this example a single attribute value was replaced, the analysis module 133 also can replace multiple attribute values for a product title with a respective attribute type. For example, a product title may include a color and a size. For such a product title, the analysis module 133 may replace the value for the color with the term "Color" and the value for the size with the term "Size."

In block 415, for each set of product offers for a merchant 105 that has the same variant key, the analysis module 133 considers the extracted attribute values for each product offer having that variant key and determines whether each product offer has a unique set of attribute values. For example, consider the variant key "Color Music Player." The analysis module 133 identifies each product offer for a given merchant 105 having the variant key "Color Music Player" and examines the color attribute values for each of those product offers to determine whether the attribute values are unique.

The analysis module 133 typically performs the acts of block 415 for each merchant 105 separately as each merchant 105 typically has a particular way in which the merchant 105 identifies variant attributes in the product titles. For example, one merchant 105 may abbreviate colors while another merchant 105 may use the complete term for the color.

In block 420, the analysis module 133 assigns a merchant cluster identifier to each set of product offers that have a particular variant key and unique attribute values. If each product offer for a merchant 105 that has the same variant key has a unique set of attribute values, then the analysis module 133 may conclude that the products of those product offers are variants of the same product. For example, if each product offer for a merchant 105 that has the variant key "Color Music Player" have a unique color with respect to each other ones of those product offers, then the analysis module 133 may conclude that the products of those product offers are variants of each other. The analysis module 133 assigns a unique merchant cluster identifier to each set of product offers that are determined to be variants of one another. In block 425, the analysis module 133 groups the product offers into merchant variant product clusters based on the merchant cluster identifier.

Figure 5:
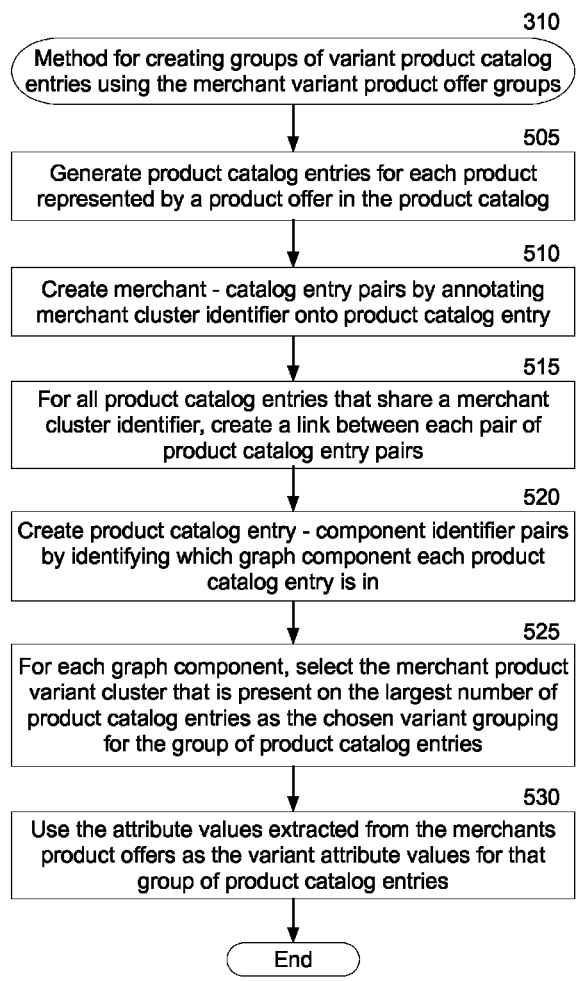
FIG. 5 is a block flow diagram depicting a method for creating groups of variant product catalog entries using the merchant variant product groups, in accordance with certain exemplary embodiments.

FIG. 5 is a block flow diagram depicting a method 310 for creating groups of variant product catalog entries using the merchant variant product groups, in accordance with certain exemplary embodiments, as referenced in block 310 of the method 210 of FIG. 2. In block 505, the analysis module 133 generates product catalog entries for each product represented by a product offer in the product catalog 137. In one embodiment, the analysis module 133 generates the product catalog entries using the product identifiers of the product offers. Typically, the product identifiers uniquely identify their products. However, some merchant 105 may provide incorrect product identifiers. Thus, the analysis module 133 may consider other information when generating the product catalog entries, for example other product information stored in the product catalog 137.

The product catalog entries each include information regarding their respective products. This information may be obtained from one or more product offers stored in the product catalog 137 for that product. Each product catalog entry also includes a product catalog entry identifier that uniquely identifies the product catalog entry. This product catalog entry identifier may be assigned to the product catalog entry by the analysis module 133.

Each product catalog entry also includes each merchant cluster identifier associated with the product of the product catalog entry. The analysis module 133 may identify the merchant cluster identifier for each product offer for the product of the product catalog entry and include those identified merchant cluster identifiers with the product catalog entry. For example, a first product offer for a product may include a merchant cluster identifier associated with product variants of the product offered by a first merchant 105. Similarly, a second product offer for the product may include a merchant cluster identifier associated with product variants of the product offered by a second merchant 105. The analysis module 133 can identify the two merchant cluster identifiers and annotate the two merchant cluster identifiers onto the product catalog entry for the product.

In block 510, the analysis module 133 creates (merchant cluster identifier, product catalog entry identifier) pairs for each merchant cluster identifier annotated onto the product catalog entries. Thus, if a product catalog entry includes three merchant cluster identifiers, then the analysis module 133 would create three (merchant cluster identifier, product catalog entry identifier) pairs, one for each merchant cluster identifier.

In block 515, the analysis module 133 identifies product catalog entries that have matching merchant cluster identifiers. For each pair of product catalog entries that have the same merchant cluster identifier, the analysis module 133 creates a link, an association, or a graph "edge," between the product catalog entry identifiers for the pair of products. Thus, the product catalog entry identifier for a first of the pair of product catalog entries is linked to the product catalog entry identifier for the second of the pair of product catalog entries.

In block 520, the analysis module 133 executes a "connected components" algorithm or computer program that produces (product catalog entry identifier, component identifier) pairs that identify which "graph component" each product catalog entry is included in. That is, each component identifier identifies a unique component of a graph having as edges the associations between the merchant cluster identifiers and the product catalog entry identifiers and also having edges between the pairs of product catalog entries having matching merchant cluster identifiers. A graph component or connected component of the graph is a subgraph of the graph in which any two vertices (merchant cluster identifier or product catalog entry identifier) are connected directly or through a chain of edges, and which is connected to no additional vertices. Thus, a graph component includes a set of one or more merchant cluster identifiers that are associated with a set of one or more product catalog entry identifiers.

Figure 6:
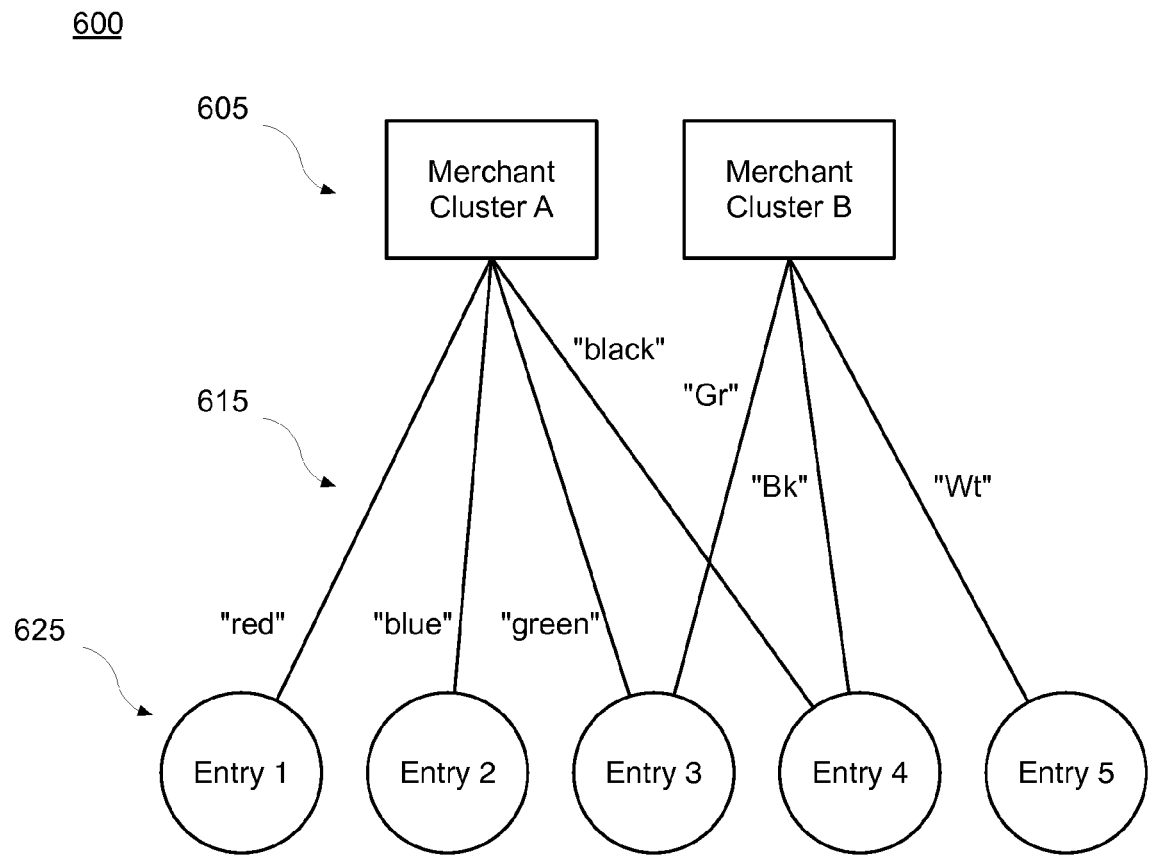
FIG. 6 depicts a graph component having merchant clusters and product catalog entries, in accordance with certain exemplary embodiments.

For example, FIG. 6 depicts a graph component 600 having merchant clusters 605 and product catalog entries 625, in accordance with certain exemplary embodiments. The exemplary graph component 600 may be a connected component of a larger graph. As shown in FIG. 6, the graph component 600 includes two merchant clusters 605, merchant cluster A and merchant cluster B, and five product catalog entries 625. Also shown in FIG. 6 are the edges 615 that link the merchant clusters 605 to the product catalog entries 625.

In this example, product catalog entry 1 is a red variant of a product; product catalog entry 2 is a blue variant of the product; product catalog entry 3 is a green variant of the product; product catalog entry 4 is a black variant of the product; and product catalog entry 5 is a white variant of the product. The edges 615 indicate that the merchant of merchant cluster A offers the red, blue, and green variants of the product and the merchant of merchant cluster B offers the green, black, and white variant of the product.

Referring back to FIG. 5, in block 525, the analysis module 133 selects sets of product variants using the identified graph components, such as the graph 600 of FIG. 6. In one embodiment, the analysis module 133 determines, for each graph component, the merchant product variant cluster that is linked to or associated with the greatest number of product catalog entries of that graph component. The analysis module 133 may select the product offers for the product catalog entries linked to the merchant product cluster that is linked to the greatest number of product catalog entries of that graph as the product variants for that graph component. For example, referring back to FIG. 6, the merchant cluster A includes as variant attributes the attributes "red," "blue," "green," and "black," for the red product (product catalog entry 1), the blue product (product catalog entry 2), the green product (product catalog entry 3), and the black product (product catalog entry 4), respectively. Likewise, the merchant cluster B includes as variant attributes the attributes "Gr," "Bk," and "Bk," for the green product (product catalog entry 3), the black product (product catalog entry 4), and the white product (product catalog entry 5), respectively. In this example, the analysis module 133 may select the product offers of the product catalog entries linked to merchant cluster A as the variants for the graph component 600 as the merchant cluster A is linked to four product catalog entries 625 while the merchant cluster B is linked to three product catalog entries 625. Thus, the analysis module 133 may determine that the product of this graph component 600 has four variants, "red," "blue," "green," and "black" and the product catalog system 130 may associate, link, or group the product offers for those variants together. As the white variant is linked to merchant cluster B only, the product catalog system 130 may determine not to include the white variant in the grouping in this exemplary implementation.

In certain exemplary embodiments, a more sophisticated approach may be used to determine which product catalog entries are variants. For example, rather than discarding the white variant as a product variant, the analysis module 133 may analyze other cases where product catalog entries has matched product offers from the merchant 105 of merchant cluster B where the color value was "Wt," and determine what color values were extracted from the merchant 105 of merchant cluster A. The would allow the analysis module 133 to learn a mapping from "Wt" to the color values provided by the merchant 105 of merchant cluster A. The analysis module 133 may include product catalog entry 5 in the variant cluster, and use the color attribute value from that mapping.

In block 530, the analysis module 133 uses the variant attribute values for the merchant variant cluster that is linked to the most product catalog entries for designating product variants in the user interface. For example, referring back to FIG. 6, the analysis module 133 may use the attribute values "red," "blue," "green," and "black" of merchant cluster A to designate the respective product variants rather than the abbreviations of merchant cluster B. If a user operating an end user network device 145 submits a query for a product, the product catalog system 130 may transmit information regarding the product and information regarding the variants of that product. This variant information may include the variant attribute values for the merchant product variant clustering having the largest number of product catalog entries for that product.

General

The exemplary methods and blocks described in the embodiments presented previously are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments of the invention have been described above in detail, the description is merely for purposes of illustration. Various modifications of, and equivalent blocks corresponding to, the disclosed aspects of the exemplary embodiments, in addition to those described above, can be made by those having ordinary skill in the art without departing from the spirit and scope of the invention defined in the following claims, the scope of which is to be accorded the broadest interpretation so as to encompass such modifications and equivalent structures.

What is claimed is:

1. A computer-implemented method for identifying product variants, comprising:
   receiving, by a computer, product offers from a plurality of merchants, each product offer comprising a product title comprising a variant attribute value that identifies a variant of a product subject of the product offer;
   identifying, by the computer, at least one set of product offers for each merchant that are likely to be variants based on the product title of the product offers and assigning a merchant cluster identifier to each identified set of product offers;
   grouping, by the computer, the product offers of each identified set of product offers with product catalog entries based on the product subject of each product offer, wherein the computer maps the product offers to the product catalog entries, and wherein each product catalog entry comprises a particular product variant;
   for each product catalog entry, assigning, by the computer, the merchant cluster identifier assigned to each product offer of each identified set of product offers grouped with the product catalog entry, wherein the merchant cluster identifiers become associated with the corresponding product catalog entry;
   grouping, by the computer, product catalog entries that comprise overlapping associated merchant cluster identifiers;
   for each group of product catalog entries, determining, by the computer, which merchant cluster identifier is associated with the most product catalog entries;
   classifying, by the computer, the product catalog entries associated with the merchant cluster identifier determined to have the most product catalog entries as a set of product catalog entries that comprise variants of the same product;
   for each set of product catalog entries that comprise variants of the same product, determining, by the computer, variant product attribute values based on the variant product attribute values of the product offers grouped with the set of product catalog entries; and
   causing, by the computer, the variant attribute values of the set of product catalog entries to be presented.

2. The computer-implemented method of claim 1, further comprising:
   receiving a query;
   selecting a product catalog entry based on the received query;
   transmitting information regarding the product of the selected product catalog entry, the transmitted information comprising the variant attribute values of the product catalog entry;
   receiving a selection of one of the variant attribute values of the product catalog entry; and
   transmitting at least one product offer of the selected product catalog entry that is associated with the selected attribute value.

3. The computer-implemented method of claim 1, wherein identifying at least one set of product offers for each merchant that are likely to be variants comprises:
   identifying a plurality of product offers for the merchant that each have a product title comprising matching product names and matching variant attribute types;
   determining whether the product titles for each of the plurality of product offers comprise different attribute values; and
   in response to a determination that the product titles for each of the plurality of product offers comprise different attribute values, classifying the plurality of product offers as likely to be product variants.

4. The computer-implemented method of claim 1, wherein the variant product attribute values for the set of product catalog entries that comprise variants of a product comprise the variant attribute values of the merchant cluster identifier that is associated with the most product catalog entries for the grouped set of product catalog entries.

5. A computer program product, comprising:
   a non-transitory computer-readable medium having computer-readable program instructions embodied therein that when executed by a computer cause the computer to identifying product variants, the computer-readable program instructions comprising:
      computer-readable program instructions for receiving product offers from a plurality of merchants, each product offer comprising a product title comprising a variant attribute value that identifies a variant of a product subject of the product offer;
      computer-readable program instructions for identifying at least one set of product offers for each merchant that are likely to be variants based on the product title of the product offers and assigning a merchant cluster identifier to each identified set of product offers;
      computer-readable program instructions for grouping each identified product offer to database entries based on the product subject to each product offer, wherein each database entry comprises a particular product variant;
      computer-readable program instructions for, for each database entry, assigning, the merchant cluster identifier assigned to each product offer of each identified set of product offers grouped with the database entry, wherein the merchant cluster identifiers become associated with the corresponding database entry;
      computer-readable program instructions for grouping database entries that comprise overlapping associated merchant cluster identifiers;
      computer-readable program instructions for, for each group of database entries, determining which merchant cluster identifier is associated with the most database entries; and
      computer-readable program instructions for classifying the database entries associated with the merchant cluster identifier determined to have the most database entries as a set of database entries that comprise variants of the same product.

6. The computer program product of claim 5, further comprising:
   computer-readable program instructions for receiving a query;
   computer-readable program instructions for selecting a database entry based on the received query;
   computer-readable program instructions for transmitting information regarding the product of the selected database entry, the transmitted information comprising the variant attribute values of the database entry;

computer-readable program instructions for receiving a selection of one of the variant attribute values of the database entry; and computer-readable program instructions for transmitting at least one product offer of the selected database entry that is associated with the selected attribute value.

7. The computer program product of claim 5, wherein identifying at least one set of product offers for each merchant that are likely to be variants comprises:

computer-readable program instructions for identifying a plurality of product offers for the merchant that each have a product title comprising matching product names and matching variant attribute types;

computer-readable program instructions for determining whether the product titles for each of the plurality of product offers comprise different attribute values; and computer-readable program instructions for classifying the plurality of product offers as likely to be product variants in response to a determination that the product titles for each of the plurality of product offers comprise different attribute values.

8. The computer program product of claim 5, further comprising:

computer-readable program instructions for, for each set of database entries that comprise variants of the same product, determining variant product attribute values based on the variant attribute values of the product offers grouped with the set of database entries; and computer-readable program instructions for causing the variant attribute values of the set of database entries to be presented.

9. The computer program product of claim 8, wherein the variant product attribute values for the set of database entries that comprise variants of a product comprise the variant attribute values of the merchant cluster identifier that is associated with the most database entries for the grouped set of database entries.

10. A system for identifying product variants, comprising:
a storage medium; and
a processor communicatively coupled to the storage medium, wherein the processor executes application code instructions that are stored in the storage medium to cause the system to:
receive product offers from a plurality of merchants, each product offer comprising a product title comprising a variant attribute value that identifies a variant of a product subject of the product offer;
identify at least one set of product offers for each merchant that are likely to be variants based on the product title of the product offers and assigning a merchant cluster identifier to each identified set of product offers;
group each identified set of product offers with product catalog entries based on the product subject of each product offer, wherein each product catalog entry comprises a particular product variant;
for each product catalog entry, assign, the merchant cluster identifier assigned to each product offer grouped with the product catalog entry, wherein the merchant cluster identifier becomes associated with the corresponding product catalog entry;
group product catalog entries that comprise overlapping associated merchant cluster identifiers;
for each group of product catalog entries, determine which merchant cluster identifier is associated with the most product catalog entries; and
classify the product catalog entries associated with the merchant cluster identifier determined to have the most product catalog entries as a set of product catalog entries that comprise variants of the same product.

11. The system of claim 10, wherein the processor is further configured to execute computer-executable instructions stored in the storage medium to cause the system to:
receive a query;
select a product catalog entry based on the received query;
transmit information regarding the product of the selected product catalog entry, the transmitted information comprising the variant attribute values of the product catalog entry;
receive a selection of one of the variant attribute values of the product catalog entry; and
transmit at least one product offer of the selected product catalog entry that is associated with the selected attribute value.

12. The system of claim 10, wherein identifying at least one set of product offers that are likely to be variants comprises computer-executable instructions stored in the storage medium to cause the system to:
identify a plurality of product offers for the merchant that each have a product title comprising matching product names and matching variant attribute types;
determine whether the product titles for each of the plurality of product offers comprise different attribute values; and
classify the plurality of product offers as likely to be product variants in response to a determination that the product titles for each of the plurality of product offers comprise different attribute values.

13. The system of claim 10, wherein the processor is further configured to execute computer-executable instructions stored in the storage medium to cause the system to:
for each set of product catalog entries, that comprise variants of the same product, determine variant product attribute values based on the variant attribute values of the product offers grouped with the set of product catalog entries; and
cause the variant attribute values of the set of product catalog entries to be presented.

14. The system of claim 13, wherein the variant product attribute values for the set of product catalog entries that comprise variants of a product comprise the variant attribute values of the product offers of the merchant cluster identifier that is associated with the most product catalog entries for the grouped set of product catalog entries.

15. A computer-implemented method for identifying product variants, comprising:
receiving, by a computer, product offers from a plurality of merchants, each product offer comprising a product title comprising a variant attribute value that identifies a variant of a product subject of the product offer;
identifying, by the computer, at least one set of product offers for each merchant that are likely to be variants based on the product title of the product offers and assigning a merchant cluster identifier to each identified set of product offers; and
grouping, by the computer, the product offers of each identified set of product offers with product catalog entries based on the product subject to each product offer, wherein each product catalog entry comprises a particular product variant;
for each product catalog entry, assigning, by the computer, the merchant cluster identifier assigned to each product offer if each identified set of product offers grouped with the product catalog entry, wherein the merchant cluster identifiers become associated with the corresponding product catalog entry;

grouping product catalog entries that comprise overlapping associated merchant cluster identifiers;

for each group of product catalog entries, determining which merchant cluster identifier associated is associated with the most product catalog entries; and classifying the product catalog entries associated with the merchant cluster identifier determined to have the most product catalog entries as the set of product catalog entries that comprise variants of the same product.

16. The computer-implemented method of claim 15, further comprising:

for each set of product catalog entry that comprise variants of the same product, determining, by the computer, variant product attribute values based on the variant product attribute values of the product offers assigned to the set of product catalog entries; and causing, by the computer, the variant attribute values of the set of product catalog entries to be presented.

17. The computer-implemented method of claim 16, further comprising:

receiving a query;

selecting a product catalog entry based on the received query;

transmitting information regarding the product of the selected product catalog entry, the transmitted information comprising the variant attribute values of the product catalog entry;

receiving a selection of one of the variant attribute values of the product catalog entry; and transmitting at least one product offer of the selected product catalog entry that is associated with the selected attribute value.

18. The computer-implemented method of claim 15, wherein identifying at least one set of product offers that are likely to be variants comprises:

identifying a plurality of product offers for the merchant that each have a product title comprising matching product names and matching variant attribute types;

determining whether the product titles for each of the plurality of product offers comprise different attribute values; and in response to a determination that the product titles for each of the plurality of product offers comprise different attribute values, classifying the plurality of product offers as likely to be product variants.

* * * * *